United States Patent
Hackenschmied et al.

(10) Patent No.: US 8,135,109 B2
(45) Date of Patent: Mar. 13, 2012

(54) DIRECT RADIATION CONVERTER

(75) Inventors: Peter Hackenschmied, Nürnberg (DE);
Matthias Strassburg, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 91 days.

(21) Appl. No.: 12/588,244

(22) Filed: Oct. 8, 2009

(65) Prior Publication Data

US 2010/0098210 A1   Apr. 22, 2010

(30) Foreign Application Priority Data

Oct. 9, 2008   (DE) .......... 10 2008 051 045

(51) Int. Cl.
*H05G 1/60* (2006.01)
(52) U.S. Cl. ...................... 378/19; 250/370.09
(58) Field of Classification Search ............ 378/19,
378/4, 98.8; 250/370.09, 370.15, 370.13
See application file for complete search history.

(56) References Cited

U.S. PATENT DOCUMENTS

| | | |
|---|---|---|
| 2003/0016779 A1 | 1/2003 | Pohan et al. |
| 2006/0034418 A1 | 2/2006 | Heismann et al. |
| 2006/0289773 A1 | 12/2006 | Blevis |
| 2007/0127625 A1 | 6/2007 | Hornig |
| 2007/0158575 A1* | 7/2007 | Heismann et al. ....... 250/370.15 |
| 2007/0278412 A1 | 12/2007 | Hackenschmied et al. |
| 2008/0173822 A1 | 7/2008 | Feltgen et al. |

FOREIGN PATENT DOCUMENTS

| | | |
|---|---|---|
| DE | 3116233 A1 | 11/1982 |
| DE | 29823994 U1 | 4/2000 |
| DE | 102004039681 B4 | 6/2006 |
| DE | 102006029104 A1 | 1/2007 |
| DE | 10135288 B4 | 4/2007 |
| DE | 102005055176 A1 | 5/2007 |
| DE | 102005061358 A1 | 7/2007 |
| DE | 102006046314 A1 | 4/2008 |
| DE | 102006025764 B4 | 7/2008 |

OTHER PUBLICATIONS

Alan Owens, A. Peacock, "Compound semiconductor radiation detectors", Nuclear Instruments and Methods in Physics Research A 531 (2004), pp. 18-37; Others.
German Office Action dated Sep. 17, 2009.

* cited by examiner

*Primary Examiner* — Hoon Song
(74) *Attorney, Agent, or Firm* — Harness, Dickey & Pierce, P.L.C.

(57) ABSTRACT

A direct radiation converter is disclosed. In at least one embodiment, the direct radiation converter is operated using a direct conversion element having a temperature of at least 38° C. and at most 55° C., and designed for detecting X-ray radiation.

7 Claims, 1 Drawing Sheet

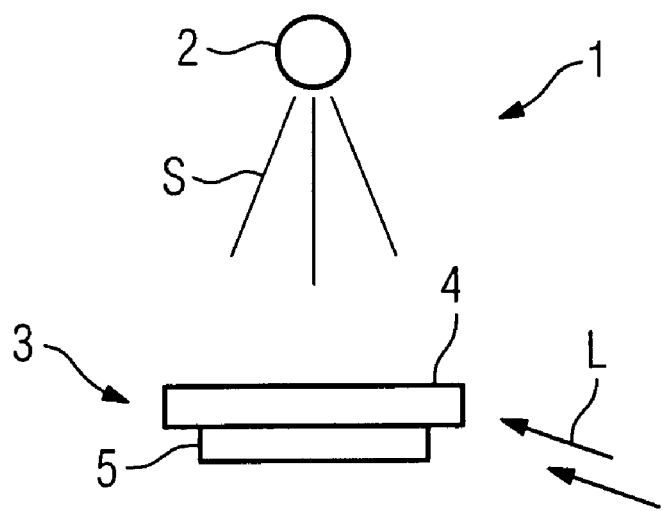
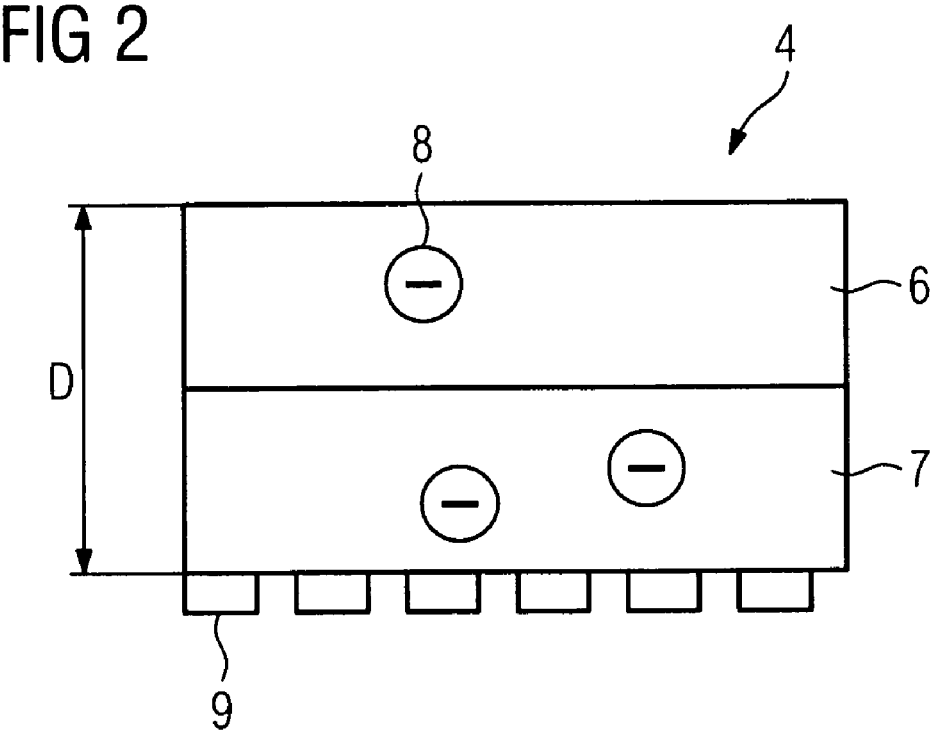

DIRECT RADIATION CONVERTER

PRIORITY STATEMENT

The present application hereby claims priority under 35 U.S.C. §119 on German patent application number DE 10 2008 051 045.9 filed Oct. 9, 2008, the entire contents of which are hereby incorporated herein by reference.

FIELD

At least one embodiment of the invention generally relates to a direct radiation converter suitable for detecting gamma or X-ray radiation, and/or to a method for operating such a detector.

BACKGROUND

By way of example, a direct radiation converter is known from DE 10 2006 046 314 A1. This direct radiation converter has a direct conversion layer produced from a material which can convert radiation into electric charge. AlSb, CdS, CdTe, CdZnTe, GaAs, Ge and Se are mentioned as suitable materials.

X-ray detectors, which have an X-ray conversion layer or a scintillation layer which first of all converts incident X-ray radiation into visible light which can be detected using photodiodes, have to be distinguished in principle from direct radiation converters. By way of example, such an X-ray detector is known from DE 10 2005 055 176 A1 and designed as a flat-panel detector.

The selection of a suitable temperature range can in general be significant during the operation of radiation detection apparatuses. DE 101 35 288 B4, relating to a detector module for an X-ray computed tomography scanner, mentions for a sensor array a temperature range from 30° C. to 35° C. which is set by means of a heating element. Tempering an X-ray detector by means of cooling air is disclosed in, for example, DE 10 2006 025 764 B4.

In the case of direct conversion gamma or X-ray detectors, nonlinear relationships which cannot be ignored can occur between the radiation incident on the detector and the generated electric signal, particularly at high radiation densities. Such nonlinear relationships can be traced back to intrinsic impurities in the detector material: fixed charges bound to such impurities intercept the charge carriers generated by the radiation, with the charges being able to recombine therewith. This reduction in the electric field, based on capturing moveable charge carriers and suggesting a significantly lower intensity of the radiation, is referred to as polarization. The polarization is equivalent to forming a space charge in the detector material which hinders charge carrier mobility. Due to the polarization effect, direct radiation converters are subject to severe restrictions with respect to the maximum detectable radiation density.

SUMMARY

At least one embodiment of the invention extends the applicability of direct radiation converters compared to the prior art, particularly in the field of imaging diagnostic equipment.

According to at least one embodiment of the invention, a method is disclosed for operating a direct radiation converter designed to detect X-ray or gamma radiation, and an apparatus suited to carrying out this method is disclosed. Refinements and advantages explained below in the context of the direct radiation converter analogously also hold for the method, and vice versa.

The direct radiation converter is operated using a direct conversion element designed for detecting gamma or X-ray radiation and having a temperature maintained at at least 38° C. and at most 55° C. Here, a direct conversion element is understood to be a detector element which directly converts radiation acting thereon, specifically X-ray or gamma radiation, into electric charge which can be detected by metrological means.

By selecting the temperature range from 38° C. to 55° C., the polarization effect surprisingly is avoided or at least strongly damped compared to the prior art.

At least one embodiment of the invention is based on the consideration that the transit time of the charge carriers in the direct conversion detector element is mainly determined by scattering processes on the lattice of the semiconducting detector material, but also to a large extent by impurities and defects, with electrons and holes having different mean values due to the respective mobility and lifetime thereof. Electrons, which compared to the holes have a significantly higher mobility in the detector material, are utilized for signal processing in the direct radiation converter. Positive space charges which are generated by holes bound to impurities can locally significantly increase the transit time of electrons and this constitutes an undesired effect.

In the temperature range from 38° C. to 55° C., in which the direct conversion element is operated, it was found that, on the one hand, high electron mobility is given and, on the other hand, that the influence of hole-forming impurities in the detector material is kept low. In particular, there is only a very low concentration of flat hole-traps, with the dwell time of the holes in the impurities at the same time being significantly reduced as a result of the increased temperature compared to room temperature and so practically no space charge is formed. Thus the mobility toward the anode of the free electrons created by the radiation is almost uninhibited. As a result of this, the direct radiation converter is suitable in particular for high radiation fluxes of more than $10^8$ photons per $mm^2$ and second.

A detector material temperature of less than 38° C. would result in an increase in the number of holes at the impurities, and so there would be space charge and polarization. By contrast, a temperature of over 55° C. would reduce the number of holes at the impurities, but this positive effect would be overcompensated for by an increased thermal leakage current. Moreover, the increased temperature would reduce the energy resolution of the direct radiation converter. Besides, an additional increase in temperature could generate further defects which adversely affect the detector properties.

Within the selected temperature range from 38° C. to 55° C., the pulse width of the electric signals generated by the incident X-ray or gamma quanta is almost independent of the temperature. Hence the direct radiation converter is particularly suitable for counting measurements.

By way of example, a peltier element is suitable for setting the temperature of the direct conversion element to be at least 38° C. and at most 55° C. Targeted guiding of a heat carrier or cooling medium, e.g. cooling air, can also be used to operate the direct radiation converter within the mentioned temperature range. In general, a suitable design of the entire detector apparatus, including housing and electronics, can ensure that an equilibrium sets in between the various heat fluxes and so the temperature of the detector material does not fall below 38° C. and does not rise above 55° C.

In an example refinement the direct conversion element has a thickness of at least 1.0 mm and at most 3.0 mm, in particular of at least 1.2 mm and at most 1.8 mm. The thickness of the direct conversion element is particularly preferably at least 1.4 mm and at most 1.6 mm. Hence the material insert is significantly smaller than in older direct converters provided for detecting X-ray radiation.

In accordance with an example development, the direct conversion element is of a multilayered, e.g. double-layered, design. Here, the overall thickness of the layers lies within one of the previously mentioned ranges. Despite the low overall thickness of the direct conversion element, the direct radiation converter has a sufficient absorptivity. If the temperature range from 38° C. to 55° C. is maintained, then the transit time of the charge carriers is also in an expedient range permitting the quantitative detection of high radiation densities.

The direct conversion element is preferably produced on the basis of a semiconductor material such as CdTe, CdZnTe, CdZnTeSe, and CdTeSe.

An advantage of at least one embodiment of the invention particularly lies in the fact that operating a direct conversion X-ray detector in the temperature range from 38° C. to 55° C. provides a high-flux radiation detector suitable both for the extremely high radiation fluxes which occur particularly in computed tomography, and for the precise detection of low radiation fluxes.

BRIEF DESCRIPTION OF THE DRAWINGS

An example embodiment of the invention is explained in more detail below on the basis of the drawings, in which, schematically:

FIG. 1 shows a computed tomography scanner with a direct radiation converter and FIG. 2 shows a direct conversion element of the direct radiation converter.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A computed tomography scanner which is illustrated only in a rudimentary fashion in FIG. 1 and which is provided to be used as imaging diagnostic equipment is referred to overall by the reference symbol 1. With respect to the principle function of computed tomography equipment which can be used in medicine, reference is made in an example fashion to DE 10 2004 039 681 B4, the entire contents of which are hereby incorporated herein by reference.

The computed tomography scanner 1 is designed as a dual energy computed tomography scanner which is operated at two mutually different voltages of, for example, 80 kV and 140 kV.

The lower voltage at 80 kV supplies particularly sharp vessel displays in contrast agent examinations due to the high iodine contrast but consequently has a relatively high image noise compared to the higher voltage of 140 kV. By contrast, the higher voltage permits particularly good differentiation of soft tissue parts at low levels of image noise. The dual energy concept of the computed tomography scanner 1 advantageously unifies the specific advantages of the different voltages.

An X-ray emitter 2 emits radiation S which at least partly passes through an examination object (not illustrated), in particular a patient, and which is detected using a semiconductor detector, specifically a direct radiation converter 3. The functional main component of the direct radiation converter 3 is a direct conversion element 4 which directly converts the incident X-ray radiation S into electric signals and which is produced using at least one of the following materials: CdTe, CdZnTe, CdZnTeSe, CdTeSe.

So as to operate the direct radiation converter 3 at a defined temperature within the interval from 38° C. to 55° C., a tempering apparatus is provided which is integrated into the computed tomography scanner 1. In accordance with a first variant, the tempering apparatus has a peltier element 5 which is connected to the direct conversion element 4 in a thermally conducting fashion. In accordance with a second variant, the direct conversion element 4 is kept at an at least approximately constant temperature by way of a targeted stream of air L. Both variants for tempering the direct radiation converter 3 can be combined with one another or with other methods of heat supply and/or removal.

The direct radiation converter 3 is particularly suitable for the counting measurement of X-ray quanta. As shown in FIG. 2, the direct conversion element 4 is made up of two layers 6, 7, the overall thickness of which is referred to by D and is preferably less than 3 mm. The detected X-ray radiation generates free electrons 8, with electrodes 9 being provided for metrological detection of the free electrons and being arranged on the side facing away from the X-ray emitter 2, i.e. on the contacting side of the direct conversion element 4. On the side facing the X-ray emitter 2, the direct conversion element 4 has a metallic coating (not illustrated in FIG. 2).

The semiconductor materials from which the layers 6, 7 of the direct conversion element 4 are produced have impurities which effect a temperature-dependent influence on the properties of the direct radiation converter 3, in particular on the mobility of the electrons 8. This fact is accounted for by operating the direct conversion element 4 at a temperature of at least 38° C. and at most 55° C., and also by the thickness D of the direct conversion element 4 matched to this.

In the temperature range from 38° C. to 55° C. an artifact-free measurement is possible, even in the case of high radiation S fluxes of more than $10^8$ X-ray quanta per mm$^2$ and second incident on the direct radiation converter 3. Compared to operating temperatures outside of the mentioned region, there are only low fluctuations of the local electric field within the layers 6, 7 due to a particularly low influence of impurities and so the signal stability and the reproducibility of measurements are improved. Due to the low variations in the run times of charge carriers there is also a particularly high signal to noise ratio.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a direct radiation converter designed to detect X-ray radiation, the method comprising:
    setting the direct radiation converter to a temperature of at least 38° C. and at most 55° C.; and
    measuring an electric charge generated in the direct radiation converter by radiation incident thereupon, wherein the direct radiation converter is subject to radiation of more than $10^8$ photons/(mm$^2$ s).

2. The method as claimed in claim 1, wherein the measuring of the electric charge is effected as a counting measurement.

3. The method as claimed in claim 1, wherein the temperature of at least 38° C. and at most 55° C. is set using a peltier element.

4. The method as claimed in claim 1, wherein the temperature of at least 38° C. and at most 55° C. is set using a stream of air.

5. The method as claimed in claim 1, wherein the measuring of the electric charge is effected as a counting measurement.

6. A method, comprising:
    using a direct radiation converter, including a direct conversion element having a temperature of at least 38° C. and at most 55° C. and designed for detecting X-ray radiation, in a dual-energy computed tomography scanner; and
    subjecting the direct radiation converter to radiation of more than $10^8$ photons/(mm$^2$ s).

7. The direct radiation converter as claimed in claim 6, wherein the direct conversion element is produced on the basis of one of the following materials: CdTe, CdZnTe, CdZnTeSe, CdTeSe.

* * * * *